UNITED STATES PATENT OFFICE.

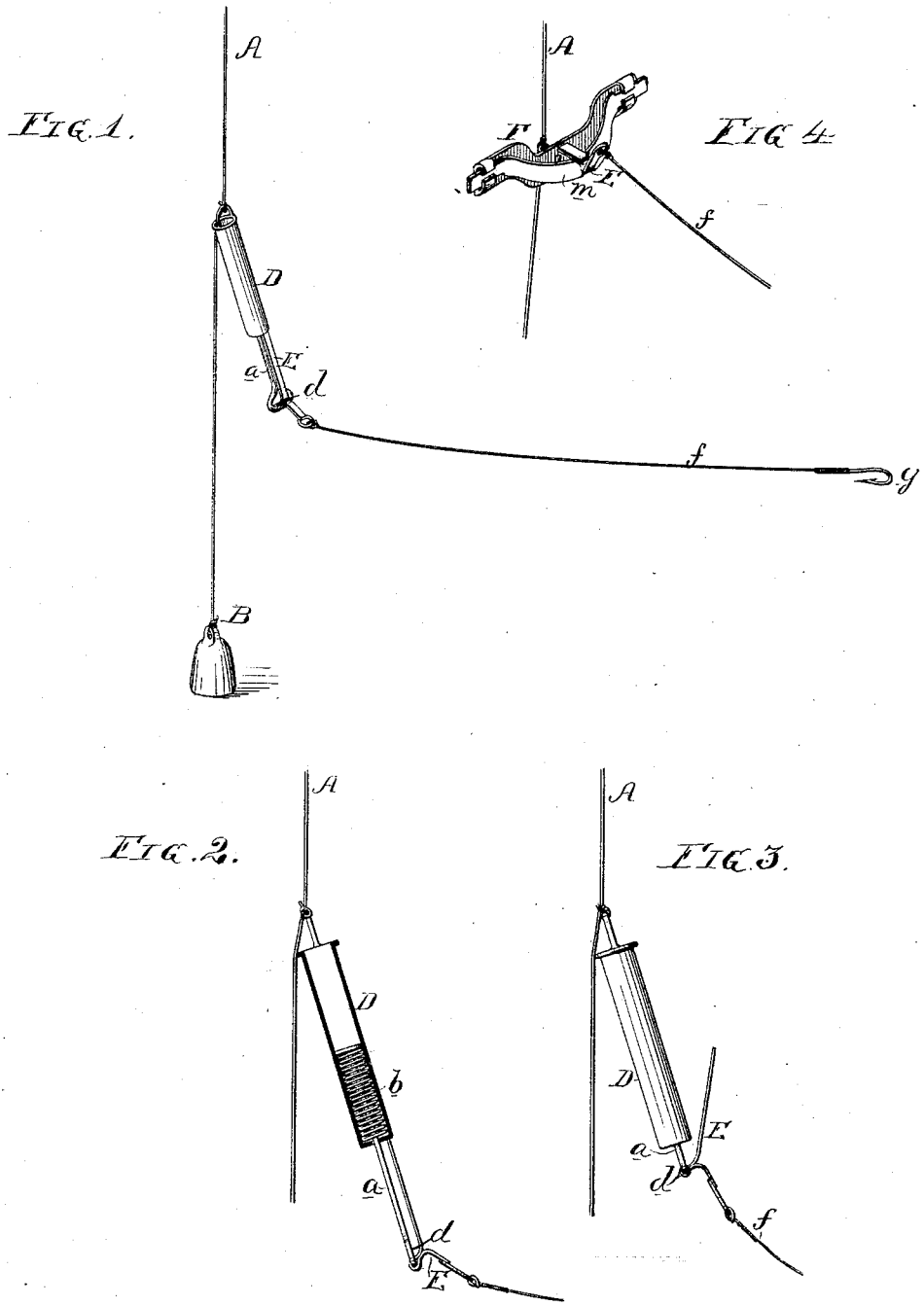

WILLIAM F. VACHÉ, OF PHILADELPHIA, PA., ASSIGNOR TO HIMSELF, JAMES À BECKET, AND JAMES CHATWIN, OF SAME PLACE.

IMPROVEMENT IN ATTACHMENTS FOR FISHING-LINES.

Specification forming part of Letters Patent No. 223,194, dated December 30, 1879; application filed August 18, 1879.

*To all whom it may concern:*

Be it known that I, WILLIAM F. VACHÉ, of Philadelphia, Pennsylvania, have invented a new and useful Improvement in Spring Attachments for Fishing-Lines, of which the following is a specification.

My invention relates to an improvement in that class of fishing-lines in which a spring-rod governed by a trigger is employed to give a sudden jerk to the line or hook when a fish nibbles at the bait.

The objects of my improvement are to prevent the exposure of the hook, to insure the transmission of the movement of the spring-rod to the hook with full force, and to prevent the twisting of the line by the movements of the fish after it is hooked.

These objects I attain, first, by combining the line with a bar or casing, a spring rod or plate carried thereby, a trigger carried the spring-rod or plate, and a "snood" attached to the trigger, carrying the hook and receiving the direct pull of the spring rod or plate; and, secondly, by combining the line with a spring-hook-operating device having a swiveling portion, so as to turn freely independently of the line, substantially as described hereinafter.

Figure 1 is a view of my improved attachment for fishing-lines as it appears when set for use; Fig. 2, an enlarged view of part of the same; Fig. 3, the same with some of the parts in a different position; and Fig. 4, a modification of my invention.

A is the fishing-line, and B the sinker or "dipsey," which is attached to the lower end of the line in the usual manner. At any desired distance above the sinker I attach to the line one end of a tube, D, the opposite end of which is closed, with the exception of a central opening, through which projects a rod, $a$, the latter having within the tube an enlarged head, between which and the closed end of said tube intervenes a spiral spring, $b$, the tendency of the latter being to retract the rod $a$. On the other end of the rod is formed an eye, $d$, to which is hung a trigger, E, made in the form of a bell-crank lever, to the short arm of which is connected the snood $f$ of the hook $g$.

The mode of setting the device is as follows: The hook being baited, the spring-rod $a$ is drawn out until the long arm of the trigger-lever E can be inserted under the end of the tube D, where it is retained by the pressure of the spring-rod, as in Fig. 2. The line being thrown into the water, the snood is carried out by the current, as in Fig. 1, and when a fish nibbles at the hook the pull upon the short arm of the trigger-lever releases the long arm of the same from the control of the tube D, and the spring $b$ causes a sudden retraction of the rod $a$, the effect of which is to impart a sharp and sudden jerk to the snood, thereby hooking the fish. The rod $a$, being free to turn in the tube D, acts as a swivel and prevents the line from being twisted by the movements of the hooked fish.

Although I prefer to use the tube D, rod $a$, and spring $b$, as shown, this construction need not be adhered to in all cases. For instance, in Fig. 4 I have shown a modification of my invention in which a bar, F, takes the place of the tube and a spring-plate, $m$, is substituted for the spring-rod $a$, the trigger-lever being hung to said plate, and the action of the device being similar to that above described. For the reason given above, the bar F is swiveled to the ring by which it is connected to the line A.

Any desired number of snoods may be connected to the trigger-lever, a nibble at any one of the hooks in such case being sufficient to operate the trigger and permit the spring to act.

I am aware that spring-hooks controlled by triggers have been heretofore used on fishing-lines; but in all of these arrangements, so far as I am aware, the trigger is connected to a supplementary hook, to which the bait is applied, the main hook not being baited. These devices are uncertain in their action, and the presence of a bare hook in such close proximity to the bait is objectionable. In my arrangement the hooks and snoods are the same as those ordinarily used, and are employed in the same manner.

The hooks and snoods can easily be replaced when broken, thereby overcoming an objection to that class of tackle in which the spring acts directly upon a hooked rod, for in the latter case the breaking of the hook renders the entire device worthless.

I claim as my invention—

1. In an attachment for fishing-lines, the combination of a trigger pivoted to a spring-support, a device, substantially as described, for holding and guiding said spring-support, and a snood attached to the trigger, carrying the hook and receiving the direct pull of the spring-support, all substantially as set forth.

2. The combination of the casing D, the rod $a$, contained therein, but capable of turning freely independently thereof, the spring $b$, the trigger E, hung to the rod $a$, and the snood $f$, connected to the trigger and carrying the hook, all substantially as set forth.

In testimony whereof I have signed my name to this specification in the presence of two subscribing witnesses.

WILLIAM F. VACHÉ.

Witnesses:
  C. F. TIETZE,
  HARRY SMITH.